March 7, 1939.　　　J. T. RIDDELL　　　2,149,465
METHOD OF MAKING PLAYING BALLS
Filed Aug. 17, 1938
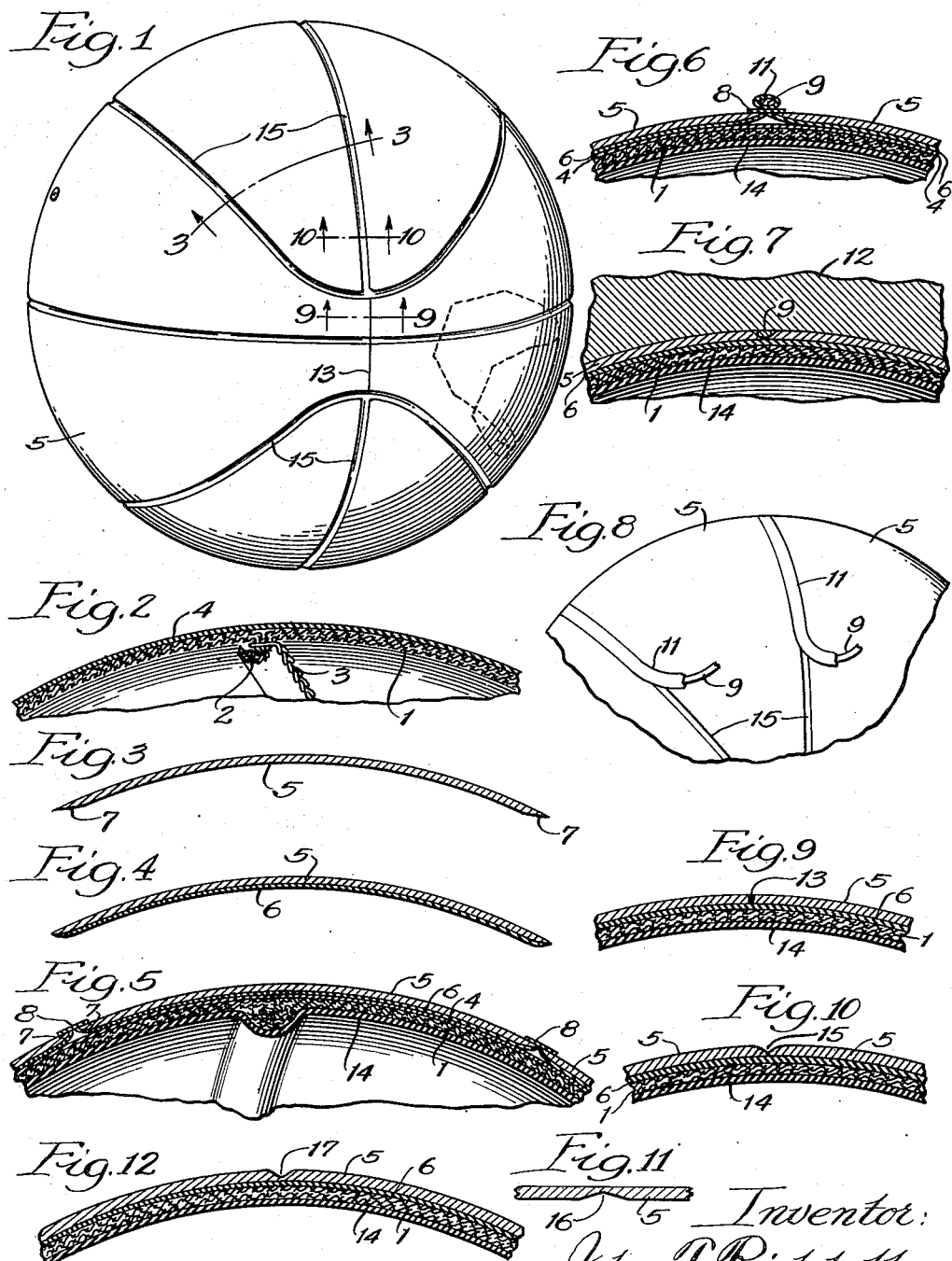
Inventor:
John T. Riddell,
By Rummler Rummler & Woodworth
Attorneys.
Witness:

Patented Mar. 7, 1939

2,149,465

UNITED STATES PATENT OFFICE 2,149,465

METHOD OF MAKING PLAYING BALLS

John T. Riddell, Chicago, Ill.

Application August 17, 1938, Serial No. 225,318

3 Claims. (Cl. 154—16)

This invention relates to large, leather-covered playing balls of the types that are appropriate for games of basketball, football, volley ball, soccer and the like.

The main object of this invention is to provide a method of making inflatable leather-covered balls so as to provide a finished product that has the style and appearance of a leather ball with inturned seams, and at the same time has the advantages that accrue to a ball having a tough leather casing made up of sections abutting edge to edge, in locations non-coincident with the seams of the supporting carcass. A further object of the invention is to provide a method of cementing the casing sections of a leather-covered ball to the carcass in such manner that those edges will meet in abutting relation in the ball surface and be protected from abrasion by external contacts, and thereby rendered more durable.

A specific embodiment of this invention is illustrated in the accompanying drawing, in which:

Figure 1 is a perspective view of a spherical ball constructed according to the hereindescribed invention.

Fig. 2 is a sectional detail of the carcass taken in the vicinity of one of its seams and showing its outer surface coated with latex preparatory to the application of the casing.

Fig. 3 is a sectional detail taken across one of the strips or sections of the outer leather casing, and showing how its marginal edges are skived or beveled on the inner surface of the strip before being applied to the carcass.

Fig. 4 is a similar view showing the inner surface coated with the latex cement.

Fig. 5 is a sectional detail taken through the inflated carcass and bladder and showing the casing sections mounted edge to edge thereon at one stage of the process of manufacture.

Fig. 6 is a fragmentary sectional detail showing the position of the groove-forming cords when applied to the seam.

Fig. 7 is a fragmentary detail illustrating the groove-forming action of the cord when the ball is in position in the forming mold.

Fig. 8 is a fragmentary detail illustrating how the cords are stripped from the seams of the finished ball.

Fig. 9 is a fragmentary sectional detail of an unindented seam used at the end of the ball, the section being taken at the line 9—9 of Fig. 1.

Fig. 10 is a corresponding view taken at the line 10—10 of Fig. 1, showing the depressed seam in its finished form.

Fig. 11 is a sectional view showing how the inner surface of a casing section may be grooved to permit its outer surface to be depressed in accordance with the surface pattern that may not necessarily correspond to the pattern of the seam lines between casing sections.

Fig. 12 is a section of the finished ball with groove at a non-marginal location.

In my improved method the carcass 1 may be of any desired structure, but is preferably made of multiple-layered fabric, cut into appropriately shaped shell sections, which, when stitched together at their marginal edges, will form a ball of the desired shape.

In Fig. 2, a preferred form of seam for the carcass is illustrated in which the marginal edges 2 of the carcass sections are turned inwardly and fastened together by a line of stitching 3, and then pressed to one side to form an internally-rounded bead over which the carcass 4 may stretch without injury when inflated.

After completing the carcass and inflating it by means of the usual bladder 14, the outer surface of the carcass is completely and smoothly covered by a layer of cement, which is preferably a latex of rubber or other appropriate composition, indicated at 4 in Fig. 2. The casing sections 5, which are preferably of leather, are similarly coated on their inner surfaces with latex 6, after having been appropriately beveled or skived at their marginal edges 7. The sections 5 are so formed that their tapered edges will abut edge to edge, as shown in Figs. 5 and 6, or they may slightly overlap each other, if desired. After the strips have been applied as in Fig. 5, a narrow band or brush mark of latex 8 is applied along these seams to the outer surface of the leather and then a cord 9, preferably previously coated with latex 11 and partly dried, is laid along the seams.

The ball is then placed in a mold that gives it its finished form, is then inflated under higher than playing pressure, and left in the mold for a short time sufficient for the cement to set. Then, after removing the ball from the mold, the cords 9 are stripped off and carry with them the cement by which they were attached to the leather casing, leaving the seam clean and of finished form 15. The cord 9 may be of any appropriate material, as for example, a tubular braided linen cord such as is used for the manufacture of shoe laces.

In certain instances it may be desirable to have the pattern of the surface grooves in some respects different from the pattern that is made by the abutting edges of the casing sections, or it may be desirable to have additional grooves between those that define the lines of the abutting edges of the casing sections.

An example of this is shown in Figure 11, where the under surface of the casing section is shown partly cut away by means of a V-shaped cut 16, which does not extend entirely through the thickness of the leather. When a cord 9 is laid on the outer surface of the casing section opposite this groove it will form a surface groove 17 similar in appearance to those grooves 15 which are formed by the skiving of the marginal edges.

It will be understood that details of the construction and procedure herein shown and described may be altered or omitted without departing from the spirit of this invention as defined by the following claims.

I claim:

1. The method of making an inflatable playing ball, which consists in taking a carcass, cementing thereon a plurality of casing sections having inwardly beveled marginal edges adjoining each other edge to edge, cementing a cord in registry over and along the lines of said adjoining edges, inflating the carcass in a mold to force such cord to depress said marginal edges to form grooves registering with the seams in said casing, and removing the cord.

2. The method of making an inflatable playing ball which consists in taking a carcass, cementing thereon a plurality of leather casing sections having oppositely beveled inwardly disposed marginal edges facing each other edge to edge, and inflating the ball in a mold in the presence of forming means shaped and positioned to depress said marginal edges to form external grooves in the finished casing.

3. The method of making an inflatable playing ball which consists in taking a carcass, cementing thereon a plurality of leather casing sections after abutting portions of their inner surfaces have been cut away to form grooves so as to define lines corresponding to a desired surface pattern and then inflating the ball in a mold in the presence of forming means positioned to depress the outer surface in registry with said lines.

JOHN T. RIDDELL.